US012651872B2

(12) United States Patent
Park et al.

(10) Patent No.: US 12,651,872 B2
(45) Date of Patent: Jun. 9, 2026

(54) WATER DETECTION METHOD AND ELECTRONIC DEVICE PERFORMING THE SAME

(71) Applicant: SAMSUNG ELECTRONICS CO., LTD., Suwon-si (KR)

(72) Inventors: Jinsu Park, Suwon-si (KR); Dongjoon Kim, Suwon-si (KR); Yusik Jo, Suwon-si (KR); Kunpil Jung, Suwon-si (KR); Woonhyung Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 18/611,234

(22) Filed: Mar. 20, 2024

(65) Prior Publication Data

US 2024/0322503 A1     Sep. 26, 2024

(30) Foreign Application Priority Data

Mar. 24, 2023   (KR) ......................... 10-2023-0039011
May 18, 2023   (KR) ......................... 10-2023-0064559

(51) Int. Cl.
H01R 13/66       (2006.01)
G01N 27/04       (2006.01)

(52) U.S. Cl.
CPC ....... H01R 13/6683 (2013.01); G01N 27/048 (2013.01)

(58) Field of Classification Search
CPC ........................... H01R 13/6683; G01N 27/048
See application file for complete search history.

(56) References Cited

U.S. PATENT DOCUMENTS

| | | | |
|---|---|---|---|
| 9,823,286 B2 | 11/2017 | Connell et al. | |
| 10,014,637 B2 | 7/2018 | Hasegawa et al. | |
| 10,114,781 B2 | 10/2018 | Whitby-Strevens et al. | |
| 10,686,283 B2 | 6/2020 | Kim | |
| 10,837,934 B2 | 11/2020 | Park et al. | |
| 2012/0220142 A1* | 8/2012 | Swier ..................... | G01V 1/201 |
| | | | 439/55 |
| 2014/0248792 A1* | 9/2014 | Behziz ................. | H01R 13/405 |
| | | | 439/489 |
| 2016/0185244 A1* | 6/2016 | Baxter .................. | B60L 3/0023 |
| | | | 320/109 |
| 2017/0124010 A1* | 5/2017 | Whitby-Strevens ........................ | |
| | | | G06F 11/3051 |

(Continued)

FOREIGN PATENT DOCUMENTS

JP        7157575        10/2022

*Primary Examiner* — Lee E Rodak
*Assistant Examiner* — Zannatul Ferdous
(74) *Attorney, Agent, or Firm* — Fish & Richardson P.C.

(57) ABSTRACT

An electronic device includes a connector connected to a cable of an external device and including a plurality of pins, a water detection circuit connected to at least one detection pin among the plurality of pins, and configured to detect, based on the at least one detection pin, whether water exists in the connector, a connection sensing circuit connected to at least one sensing pin among the plurality of pins, and configured to recognize the cable, based on the at least one sensing pin, and an application processor (AP) configured to control the water detection circuit and the connection sensing circuit such that detection of the water and recognition of the cable are performed simultaneously.

20 Claims, 12 Drawing Sheets

(56)     References Cited

U.S. PATENT DOCUMENTS

2018/0074564 A1      3/2018  Paparrizos et al.
2019/0302047 A1*    10/2019  Park ..................... G01N 27/223

* cited by examiner

WATER DETECTION METHOD AND ELECTRONIC DEVICE PERFORMING THE SAME

CROSS-REFERENCE TO RELATED APPLICATION

This application is based on and claims priority under 35 U.S.C. § 119 to Korean Patent Application Nos. 10-2023-0039011, filed on Mar. 24, 2023, and 10-2023-0064559, filed on May 18, 2023, in the Korean Intellectual Property Office, the disclosures of which are incorporated by reference herein in their entireties.

TECHNICAL FIELD

The present disclosure relates to a method of detecting water, and more particularly, to a water detection method and an electronic device performing the water detection method.

BACKGROUND

Accurately determining whether foreign substances such as water are introduced into the connector can restrict corrosion of a connector. This is because pins of the connector may be corroded as current flows through the connector in a state in which foreign substances have been introduced.

SUMMARY

The present disclosure provides a water detection method of reducing the time required for detecting water in a connector and recognizing a cable, and an electronic device performing the water detection method. When an external cable is connected to the connector, accurately and quickly recognizing the cable is important. However, the time to recognize the cable can increase as the cable recognition is determined together with determining water introduction into the connector. Accordingly, the present disclosure is directed toward simultaneous water detection and cable recognition.

According to an aspect of the present disclosure, there is provided an electronic device including a connector connected to a cable of an external device and including a plurality of pins, a water detection circuit connected to at least one detection pin among the plurality of pins and configured to detect whether water exists in the connector based on the at least one detection pin, a connection sensing circuit connected to at least one sensing pin among the plurality of pins and configured to recognize the cable based on the at least one sensing pin, and an application processor (AP) configured to control the water detection circuit and the connection sensing circuit such that detection of the water and recognition of the cable are simultaneously performed.

According to another aspect of the present disclosure, there is provided a water detection method of an electronic device including simultaneously performing water detection and cable recognition of a connector including a plurality of pins, and performing a subsequent process based on the water detection and the cable recognition, wherein the simultaneously performing of the water detection and the cable recognition includes detecting whether water exists in the connector by a first integrated circuit (IC) based on at least one detection pin among the plurality of pins, and recognizing a cable by a second IC based on at least one sensing pin among the plurality of pins.

According to another aspect of the present disclosure, there is provided a water detection method of an electronic device including a connector including a plurality of pins including recognizing a role of an external device by using at least one sensing pin among the plurality of pins, detecting water in the connector by using at least one detection pin among the plurality of pins, and setting the electronic device as either a host or a device according to a recognition result of the at least one sensing pin, wherein the recognizing and the detecting are performed simultaneously.

DETAILED DESCRIPTION

A connector may have various structures. The present disclosure provides a water detection method of preventing corrosion of the connector having various structures by recognizing a cable of an external device and simultaneously accurately determining when foreign substances such as water are introduced into the connector. In the following examples, a universal serial bus (USB) type-C or USB power delivery (PD) type-C connector structure is disclosed as a structure of the connector, and accordingly, it is assumed that the connector performs communication according to a USB type-C interface. However, application of the present disclosure may be equally or similarly applied to connectors of various other structures. For example, the techniques may be applied to other types of USB connector structures. In addition, in the following examples, a situation in which water is introduced into a connector will be described as an example of foreign substances. However, various other types of foreign substances that may flow into a connector are applicable, and accordingly, a foreign substance detection circuit and a foreign substance detection method may be respectively referred to as a water detection circuit and a water detection method.

When water is recognized, a processor or a system may determine the water as resistance. In the absence of water, a very large or infinite resistance value is detected in a floating state, but in a state where water is introduced, a relatively small resistance value is detected other than the infinite resistance value. However, the present disclosure is not limited thereto, and there are various methods of monitoring resistance, and various types of resistance detection methods may be selectively utilized.

In the following examples, in describing the configuration and operation of an electronic device, the term connector can have several meanings. A connector may be expanded to a term indicating a configuration that electrically connects two devices, because the connector may represent a receptacle to which an external cable is fastened, the terms connector and receptacle may be used interchangeably. Also, the connector may be a concept that further includes a plug, and in this case, the cable may be referred to as the plug. In addition, the term pin may be replaced with a terminal.

Figure 1:
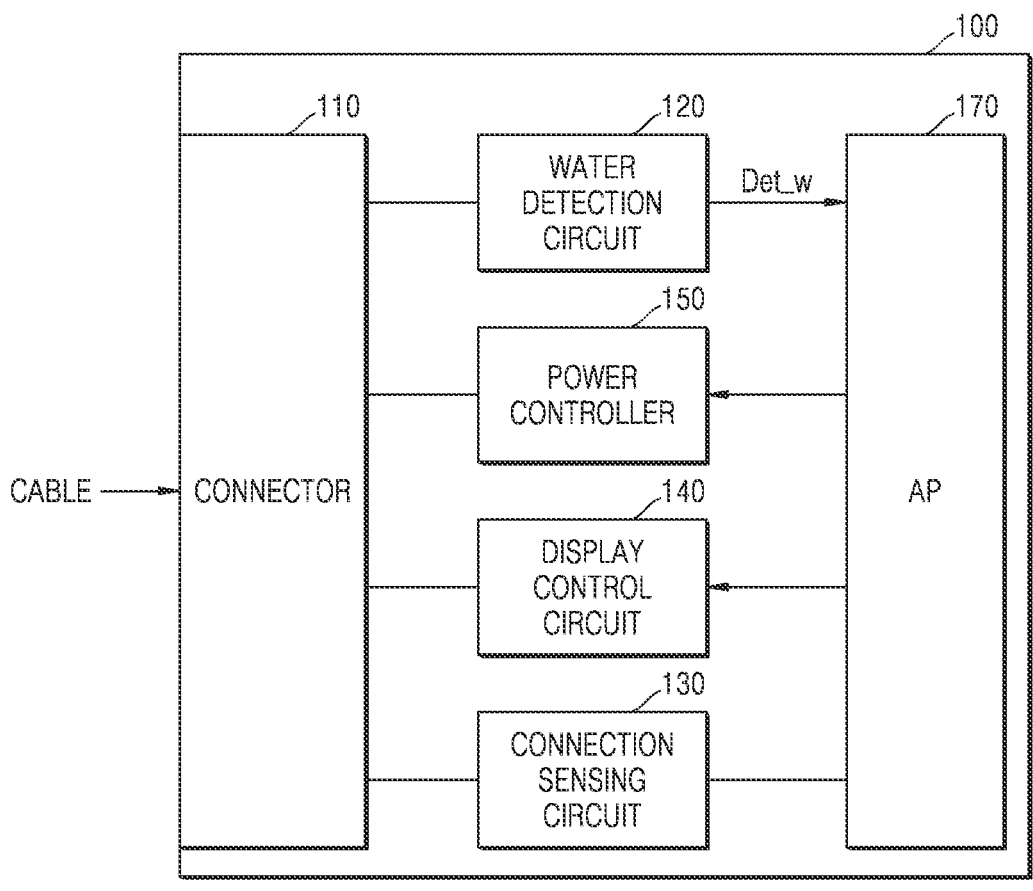
FIG. 1 is a schematic block diagram of an example of an electronic device.

FIG. 1 is a schematic block diagram of an example of an electronic device.

Referring to FIG. 1, an electronic device 100 may include a connector 110 connected to an external cable and performing communication with an external device, and a water detection circuit 120 connected to at least one pin included in the connector 110. In addition, the electronic device 100 may include a connection sensing circuit 130 connected to the at least one pin included in the connector 110. The electronic device 100 may include a processor that controls overall internal operations, for example, an application processor (AP) 170. In addition, the electronic device 100 may further include a display control circuit 140 and a power controller 150.

The electronic device 100 may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. In some implementations, the wearable device may include at least one of an accessory type, e.g., watch, ring, bracelet, anklet, necklace, glasses, contact lens, or a head-mounted-device (HMD), fabric or clothing integrated type, e.g., an electronic clothing, a body attachment type, e.g., a skin pad or a tattoo, or a living body implantable type, e.g., an implantable circuit.

The connector 110 may have various structures. Examples of the structures include a water detection device and method of corrosion or damage of the connector 110 having various structures and simultaneously recognizing a cable by accurately determining a situation in which various foreign substances including water are introduced into the connector 110. Hereinafter, in some implementations, a USB type-C or USB PD type-C connector structure is disclosed as a structure of the connector 110. However, the present disclosure is not limited thereto, and as described above, the connectors can have various other structures. For example, other types of USB connector structures can be used.

In some implementations, the water detection circuit 120 may be implemented as an integrated circuit (IC) or included in an IC that performs various functions, as the water detection circuit 120 is implemented as the IC, a processor controlling the overall operations of the IC by hardware and/or software may be further provided in the water detection circuit 120. As an example, the connector 110 includes a plurality of pins defined in a certain specification, and the water detection circuit 120 may include a circuit detecting resistance or voltage from one or more pins among the plurality of pins included in the connector 110. That is, when water is introduced into the connector 110 (or when foreign substances exist in the connector 110), a value of resistance detected from the pins changes due to the water, and the water detection circuit 120 detects the changed resistance, thereby detecting or determining whether water exists in the connector 110.

As described above, when foreign substances such as water are introduced into the connector 110, the electronic device 100 may determine the foreign substances such as water introduced through the water detection circuit 120 as resistance (or impedance). For example, the electronic device 100 may detect water by using one pin or one type of pin among pins of the USB type-C connector structure. However, other types of detection methods may be used.

In some implementations, the connection sensing circuit 130 may be implemented as an IC or included in an IC that performs various functions, as the connection sensing circuit 130 is implemented as the IC, a processor controlling the overall operations of the IC by hardware and/or software may be further provided in the connection sensing circuit 130. As an example, the connector 110 includes a plurality of pins defined with specified electronic properties, and the connection sensing circuit 130 may include a circuit capable of sensing connection of the cable and/or recognizing the cable from one or more pins among the plurality of pins included in the connector 110. That is, when a cable is connected to the connector 110 (or when an external device is connected to the connector 110), a value of resistance detected from the pins changes due to the connection, and the connection sensing circuit 130 may detect whether the cable is connected to the connector 110 and/or recognize the cable, by detecting the changed resistance.

Hereinafter, a water detection operation is described.

In some implementations, the water detection circuit 120 may perform an operation of detecting water by using battery power inside the electronic device 100 or voltage through the external cable. The water detection circuit 120 may be electrically connected to at least one pin, e.g., a detection pin, among the plurality of pins of the connector 110, and may detect or determine whether water exists by detecting resistance from the detection pin. For example, a voltage level measured from the detection pin may vary according to the resistance formed in the detection pin, and the resistance may be detected based on the voltage level, in a state in which the cable is connected to the connector 110, some of the plurality of pins provided in the connector 110 may have an open state, and any one of the pins having the open state may correspond to the detection pin described above.

The water detection circuit 120 may compare the detected voltage level with a reference value, determine whether water is detected according to a comparison result, and generate a water detection result Det_w, the water detection circuit 120 may perform an internal control operation for an additional process corresponding thereto when it is determined that water is introduced. In addition, the AP 170 may control an internal operation of the electronic device 100 based on the water detection result Det_w.

In some implementations, the AP 170 may control the display control circuit 140 based on the water detection result Det_w, thereby performing a control operation so that a warning screen indicating whether water is detected is output to a user. In addition, the power controller 150 may correspond to a power management IC and may perform a function of controlling power provided to various components inside the electronic device 100.

In some implementations, the connection sensing circuit 130 may recognize a cable of an external device when the cable of the external device is connected to the connector 110 of the electronic device 100. As an example, the external cable may be a charging cable, and according to a result of recognizing the cable of the connection sensing circuit 130, a power voltage may be provided to the electronic device 100 through the cable. Alternatively, according to a result of recognizing the cable of the connection sensing circuit 130, the electronic device 100 may supply voltage to the external device through the external cable.

More specifically, the connection sensing circuit 130 may be electrically connected to at least one pin, e.g., a sensing pin, among the plurality of pins of the connector 110, and recognize the cable based on the sensing pin. In some implementations, the connection sensing circuit 130 may recognize the cable based on a resistance or voltage detected (or sensed) from the sensing pin. Through this, for example, the cable (or the external device) may be recognized as either a source supplying power or a sink receiving power. Alternatively, for example, the cable (or the external device) may be recognized as either a host or a device. In other words, a role of the electronic device 100 may be determined as the source or the sink (or converted from the source to the sink or from the sink to the source) according to a recognition result. However, the present disclosure is not limited thereto, and there are various methods of recognizing a cable, and various types of related methods may be selectively used, the connection sensing circuit 130 may perform an internal control operation for a subsequent process corresponding thereto based on the cable recognition result. Additionally, the AP 170 may also control an internal operation of the electronic device 100 based on the cable recognition result.

In some implementations, the water detection operation of the water detection circuit 120 and the recognition operation of the connection sensing circuit 130 described above may be performed simultaneously as is described in detail below. When the connection of the external cable is sensed or when resistance is detected, the electronic device 100 may recognize the cable through the connection sensing circuit 130 and, simultaneously, detect water through the water detection circuit 120. The AP 170 may control the water detection circuit 120 and the connection sensing circuit 130 to simultaneously perform the above operations. Through such a simultaneous check operation, the electronic device 100 may diverge to various states to be described below.

In some implementations, the water detection circuit 120 may perform the water detection operation while the external cable is connected. For example, in a state in which the power of the electronic device 100 is turned off, as the external cable is connected, the power of the electronic device 100 may change to an on state in order to perform a function such as a charging operation (or may enter into a low power mode for activating only some functions), may output a warning screen informing that the external cable needs to be removed to reduce the possibility of damage to pins caused by water, or may perform an internal power control operation. As an example, the AP 170 may prevent current from flowing through the connector 110 by controlling the power controller 150 and may also block an operation using the connector 110, such as a charging operation.

In some implementations, each of a plurality of pins included in the connector 110 may perform a unique function for communication with the external device. In other words, the sensing pin and the detection pin may perform unique functions for communication and simultaneously be used for recognizing the cable and detecting water, respectively. For example, as is described below, in the USB type-C structure, the connector 110 may include a sideband use (SBU)1 pin and an SBU2 pin, and/or a configuration channel (CC)1 pin and a CC2 pin.

In addition, the electronic device 100 may be modified in various ways other than the configuration shown in FIG. 1. As an example, the power controller 150 or a partial configuration of the power controller 150 may be implemented in the water detection circuit 120. For example, when it is determined that water is introduced into the connector 110 according to the resistance detection result from the detection pin, the water detection circuit 120 may perform a control operation such as reducing a level of voltage or current provided to the connector 110 or blocking the provision.

Figure 2:
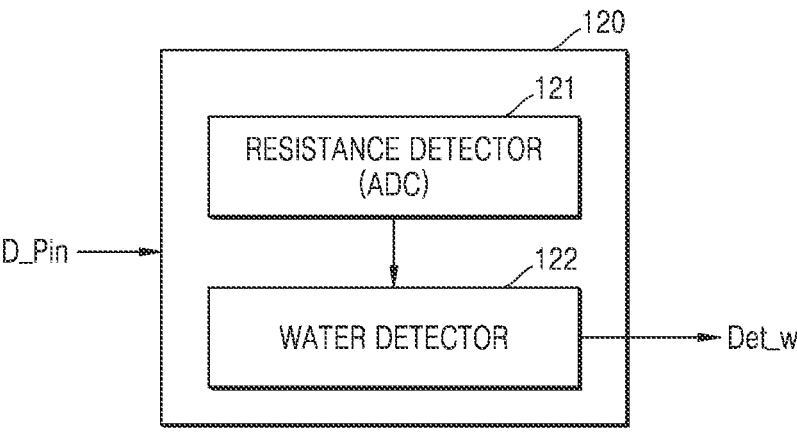
FIG. 2 is a block diagram illustrating an example of a water detection circuit.

FIG. 2 is a block diagram illustrating the water detection circuit 120.

Referring to FIG. 2, the water detection circuit 120 may include a resistance detector 121 and a water detector 122. In some implementations, the resistance detector 121 may include an analog-to-digital converter (ADC) that detects resistance from a detection pin D_Pin and outputs a digital signal corresponding to a value of the detected resistance. That is, the ADC may generate a resistance detection result by detecting voltages of different levels according to the resistance value of the detection pin D_Pin, and outputting digital codes corresponding to the detected voltages.

The water detector 122 may generate the water detection result Det_w by using an output from the resistance detector 121. For example, the resistance detector 121 may output a digital code according to the value of the detected resistance, and the water detector 122 may output the water detection result Det_w indicating that water is detected or not detected based on a digital code value. In some implementations, the water detector 122 may output the water detection result Det_w indicating that when water is detected, a small resistance value is detected from the detection pin D_Pin compared to the case where water is not detected, and when the digital code value is less than (or more than) a reference value, water has been detected.

Figure 3:
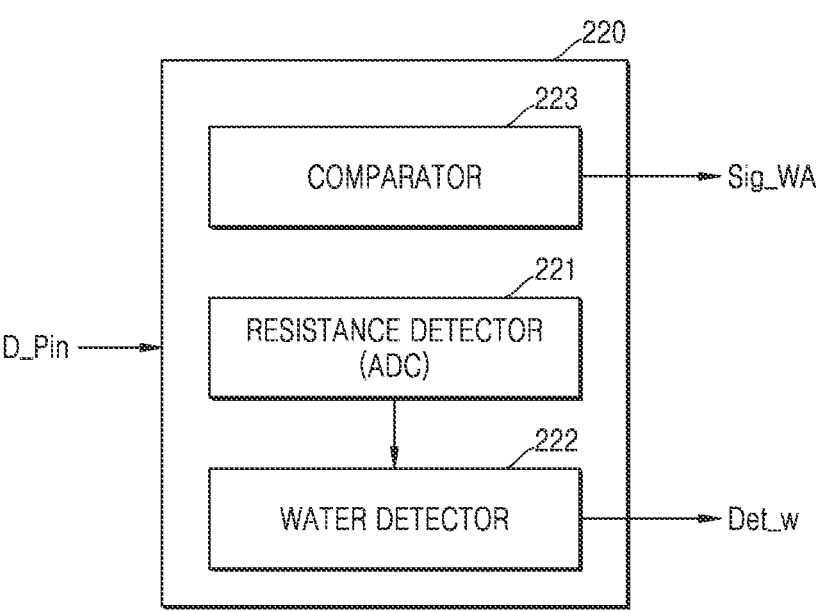
FIG. 3 is a block diagram illustrating an example of a water detection circuit.

FIG. 3 is a block diagram illustrating an example of a water detection circuit 220.

Referring to FIGS. 2 and 3, the water detection circuit 220 may include a resistance detector 221, a water detector 222, and a comparator 223. The resistance detector 221 and the water detector 222 may correspond to the resistance detector 121 and the water detector 122 described above with reference to FIG. 2, respectively. Redundant descriptions in this regard are omitted.

In some implementations, the comparator 223 may detect resistance from the detection pin D_Pin. Based on the detected resistance, the comparator 223 may generate a wait attach signal Sig_WA for entering a wait attach state which is described below with reference to FIG. 9.

Resistance detection of the comparator 223 may be referred to as first resistance detection or simplicity detection. Resistance detection of the resistance detector 221 may be referred to as second resistance detection or precision detection. For example, the second resistance detection may be based on a resistance value detected by the resistance detector 221 or may be based on an intermediate value between a resistance value detected in the first resistance detection and a resistance value detected in the second resistance detection. The water detection circuit 120 may first determine whether water is introduced through simplicity detection of the comparator 223. Thereafter, as is described below, the water detection circuit 120 may finally determine whether to detect water through precision detection of the resistance detector 221 through a certain operation. In some implementations, when it is determined that water exists through simplicity detection of the comparator 223, the water detection circuit 120 may generate the wait attach signal Sig_WA for entering the wait attach state which is a state of waiting for recognition of a sensing pin, e.g., whether the sensing pin is recognized as a source or a sink, to simultaneously perform a water detection, e.g., precision detection, operation of the cable recognition operation described above. A detailed description in this regard is given below.

Through this, water detection based on more efficient state divergence can improve the accuracy of water detection. That is, the present disclosure may prevent inefficient entry into a water state due to a single detection operation and may increase accuracy through double detection. Furthermore, the present disclosure may preemptively perform simplicity detection, thereby more efficiently perform a simultaneous check operation of simultaneously performing water detection and cable recognition.

Figure 4:
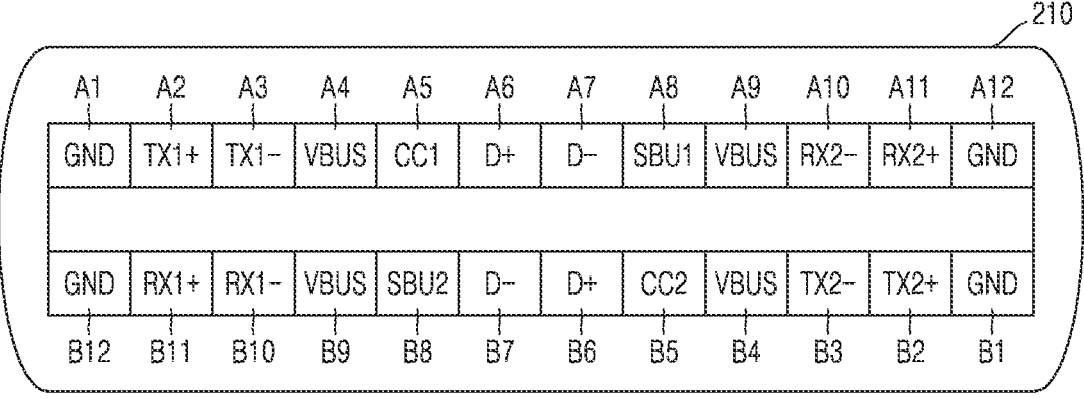
FIG. 4 is a diagram illustrating an example of a connector applied to a connector having a universal serial bus (USB) type-C structure.

FIG. 4 is a diagram illustrating an example of a connector 210 applied to a connector having a USB type-C structure. Various terms shown in FIG. 4 may be easily understood by ordinary skill in the art through the USB specification, and thus, detailed descriptions thereof are omitted.

The connector 210 of FIG. 4 may correspond to the connector 110 described above with reference to FIG. 1. As shown, pins included in the connector 210 of the USB type-C structure (or, interface) may have a symmetrical structure. That is, when a cable of either male or female gender is connected to the connector 210 of the USB type-C structure (or, interface) of an electronic device due to the symmetrical structure, connection is possible regardless of a direction of the cable. As an example, connection is possible without having to match a USB cable with a pin directionality of the connector 210.

The connector 210 of the USB type-C structure may include two rows of pins. As an example, the connector 210 of the USB type-C structure may include pins A1 to A12 of a first row and pins B1 to B12 of a second row. As an example, the connector 210 of the USB type-C structure may support data communication at various speeds. As an example, the connector 210 of the USB type-C structure may include pins A2 to A3, A10 to A11, B2 to B3, and B10 to B11 supporting high-speed data communication according to a first standard (e.g, USB 3.1) and pins A6 to A7 and B6 to B7 supporting low-speed data communication according to a second standard (e.g, USB 2.0). In addition, each of the pins A1 to A12 of the first row and the pins B1 to B12 of the second row may perform a unique function, and for example, VBUS pins A4, A9, B4, and B9 may correspond to power supply pins, GND pins A1, A12, B1, and B12 may correspond to pins that deliver ground voltage, and SBU pins A8 and B8 are pins used to support an alternate (ALT) mode, and may be connected with a cable equipped with Thunderbolt, DisplayPort, HDMI, etc.

Meanwhile, a device employing the connector 210 of the USB type-C structure may perform bi-directional communication. As an example, when the electronic device described above is connected to an external device through a USB interface, as described above, based on a recognition result of the connection sensing circuit 130 of FIG. 1, the electronic device may operate as a host, e.g., a downstream facing port (DFP), or as a device (a upstream facing port (UFP)). Alternatively, the electronic device described above may operate as a dual role port (DRP), and, at this time, may adaptively change (or convert) the role of the host (the DFP) or device (the UFP) (this is may also be referred to as a conversion function or a Try.Sink function).

The role of the electronic device as described above may be designated through CC pins A5 and B5 of the connector 210 of the USB type-C structure. As an example, in the USB interface, data connection and control may be performed by digital communication through the CC1/CC2 pins A5 and B5.

According to a model of the electronic device, only some of pins included in the connector 210 may be used. For example, some models may not use one or more GND pins among the plurality of GND pins A1, A12, B1, and B12. Alternatively, some models may not use at least one of the pins A2 to A3, A10 to A11, B2 to B3, and B10 to B11 related to high-speed data communication. Pins not used in the electronic device may not be electrically connected to ICs in the electronic device related to communication, at least one pin among the plurality of pins shown in FIG. 4 may be used as the detection pin described above. For example, at least one of the unused pins may be set as a detection pin in the example described above, and the water detection circuit 120 of FIG. 1 may be connected to the detection pin. Alternatively, a water detection period may be set before a cable is connected to the connector 210 and the detection pin performs a corresponding function, and the water detection circuit 120 of FIG. 1 may be provided in an IC to be connected to the detection pin, and water may be detected in the water detection period through the detection pin.

Figure 5:
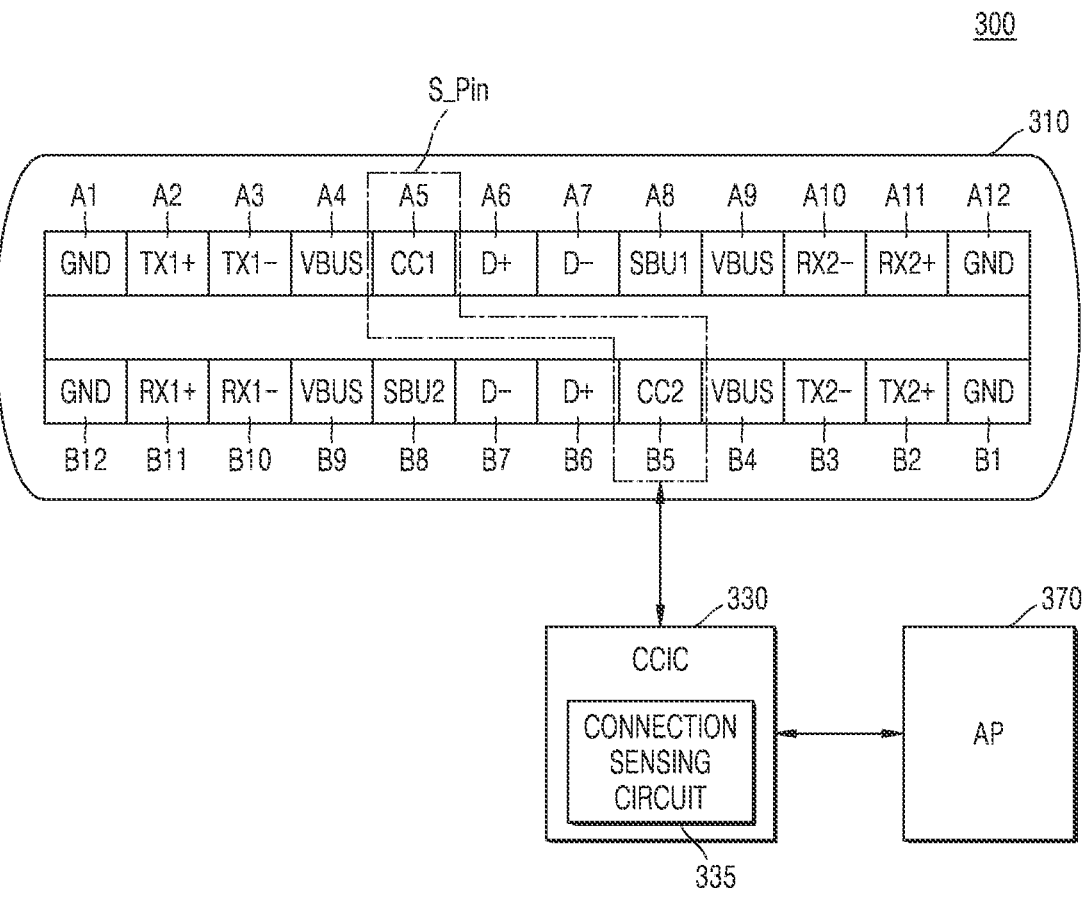
FIG. 5 is a diagram illustrating an example of recognizing a cable by using pins included in a connector.

FIG. 5 is a diagram illustrating an example of recognizing a cable by using pins included in a connector.

Referring to FIG. 5, an electronic device 300 may include a connector 310, a configuration channel integrated circuit (CCIC) 330, and an AP 370, and the connector 310 may include 24 pins that satisfy the connector specification of a USB type-C structure as described above with reference to FIG. 4. A connection sensing circuit 335 may correspond to the connection sensing circuit 130 described above with reference to FIG. 1.

Each of a plurality of pins included in the connector 310 may perform a unique function for communication with an external device. In some implementations, a cable may be recognized by using only one or more types of pin as a sensing pin S_Pin in the connector 310 of the USB type-C structure. In addition, cable recognition may be performed by measuring a voltage that varies according to cable connection.

In some implementations, in the USB type-C structure, the connector 310 may use a CC1 pin and a CC2 pin as the sensing pins S_Pin to recognize the cable. The connection sensing circuit 335 may be connected to the CC1 and CC2 pins to detect resistance values. In some implementations, the CC pin among the pins of the connector 310 of the USB type-C structure is used as the sensing pin S_Pin is described, but this is merely an example, and various other types of pins may be used. For example, when an external cable is connected to the connector 310, either the CC1 pin or the CC2 pin may have an open state or may be connected to a certain pull-down resistor, e.g., a pull-down resistor of 1 k in the USB type-C structure.

Also, in some implementations, the electronic device 300 may include the CCIC 330 (or may be implemented as a power delivery integrated circuit (PDIC) or a type-C port controller (TCPC)) capable of recognizing the external cable (or device) according to a voltage or resistance detected from the sensing pin S_Pin, e.g., the CC1 pin and/or the CC2 pin. The connection sensing circuit 335 may be included in the CCIC 330.

In some implementations, the CCIC 330 (or the connection sensing circuit 335) may generate a recognition result as to which of a source and a sink is sensed as the external cable (or the external device) based on a sensing pin S_Pin. The CCIC 330 (or the connection sensing circuit 335) may provide a cable recognition result to the AP 370, and the AP 370 may control various subsequent processes based on the cable recognition result.

For example, according to the recognition result, the AP 370 may set the electronic device 300 as either the source or the sink. Alternatively, the AP 370 may operate the electronic device 300 as the host, e.g., the DFP, or set the electronic device 300 as the device, the UFP. The electronic device 300 may operate as the DRP, and, at this time, may adaptively change the role of the host (DFP) or device (the UFP) (this is may also be referred to as a conversion function or a Try.Sink function). In addition, for example, the CCIC 330 (or the connection sensing circuit 335) may determine whether the external cable supports a conversion function, e.g., the Try.Sink function or a DRP function, through the sensing pin S_Pin.

In some implementations, the above-described cable recognition operation based on the sensing pin S_Pin of the CCIC 330 (or the connection sensing circuit 335) may be performed simultaneously with a water detection operation, as is described below, and the AP 370 may control various subsequent processes according to the cable recognition result.

Figure 6:
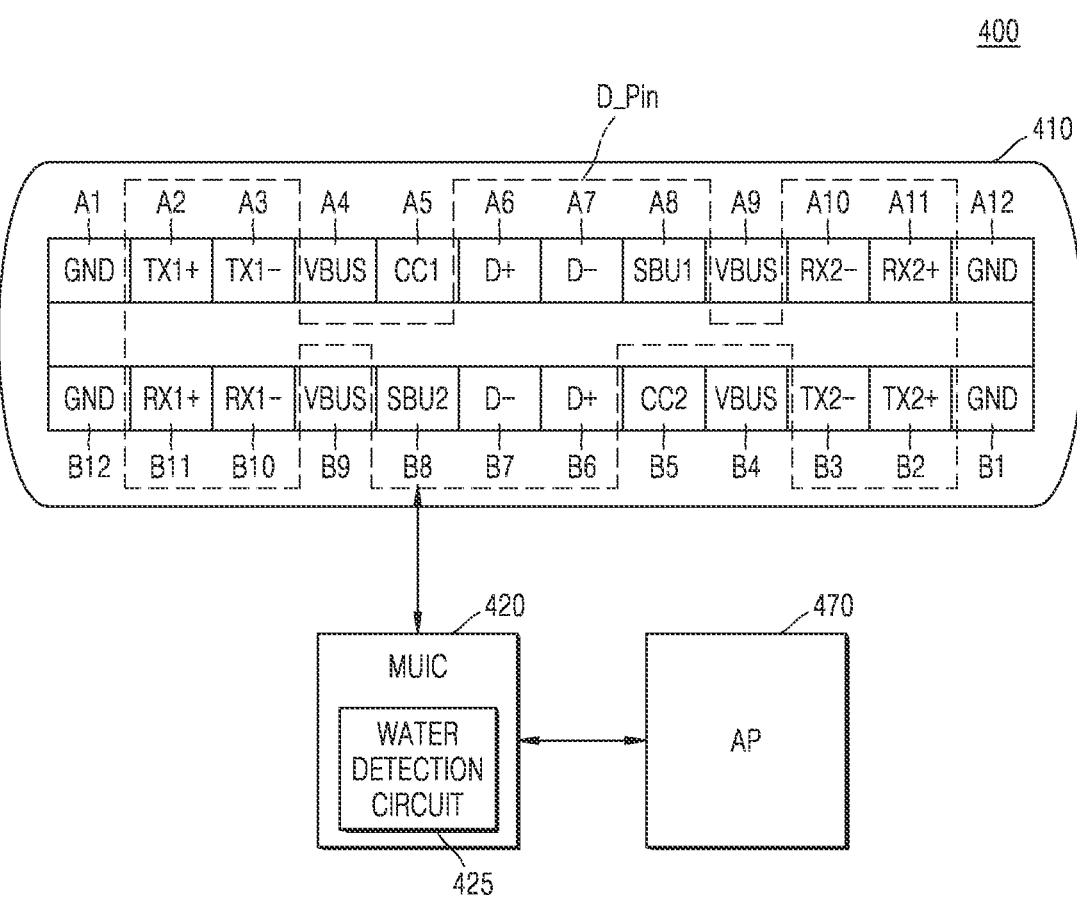
FIG. 6 is a diagram illustrating an example of detecting water by using various types of pins.

FIG. 6 is a diagram illustrating an example of detecting water by using various types of pins.

Referring to FIG. 6, an electronic device 400 may include a connector 410 of a USB type-C structure, a micro USB IC 420, and an AP 470. The connector 410 may include various types of pins described in the example described above, and in the connector 410 of the USB type-C structure, the VBUS pins A4, A9, B4, and B9 may deliver power voltage and, and the GND pins A1, A12, B1, and B12 may deliver ground voltage. A water detection circuit 425 may correspond to the water detection circuit 120 described above with reference to FIG. 1.

In some implementations, for example, at least one of pins (SBU1/SBU2 pins, TX/RX pins, D+/D− pin, etc.) other than pins that deliver the power voltage, pins that deliver the ground voltage, and pins that recognize the cable in the connector 410 may be used as the detection pin D_Pin. Because the cable recognition operation based on the sensing pins S_Pin, e.g., the CC1/CC2 pins, recognizing the cable may be performed simultaneously with the water detection operation, the sensing pins S_Pin, e.g., the CC1/CC2 pins, may not be used as the detection pin D_Pin. Accordingly, the water detection circuit 425 may perform the water detection operation described above on the detection pin D_Pin selected from among the remaining pins (SBU1/SBU2 pin, TX/RX pin, D+/D− pin, etc.) For example, at least one of the SBU1 and SBU2 pins may be used as the detection pin D_Pin, and the water detection circuit 425 may be connected to at least one of the SBU1 and SBU2 pins and detect a resistance therefrom.

In some implementations, the water detection circuit 425 may be implemented in various types of ICs or may be included in ICs, and, for example, may be included in a micro USB IC (MUIC) 420 detecting water. The water detection circuit 425 may be switchably connected to the remaining pins (SBU1/SBU2 pin, TX/RX pin, D+/D− pin, etc.), and may switchably provide a pull-up current to the remaining pins (SBU1/SBU2 pin, TX/RX pin, D+/D− pins, etc.) For example, when only one of the remaining pins (SBU1/SBU2 pin, TX/RX pin, D+/D− pin, etc.) is selected as the detection pin D_Pin used for water detection, pull-up and pull-down operations may be performed on the selected detection pin D_Pin, and the water detection operation may be performed by determining an amount of change in voltage during the pull-up and pull-down operations.

For example, when a plurality of detection pins D_Pin among the remaining pins (SBU1/SBU2 pins, TX/RX pins, D+/D− pins, etc.) are used for water detection, the pull-up and pull-down operations may be performed by time-divisionally selecting the plurality of detection pins D_Pin, and the water detection operation may be performed by determining the amount of change in the voltage during the pull-up and pull-down operations of each of the plurality of detection pins D_Pin. The water detection circuit 425 (or the MUIC 420) may finally determine whether water exists based on the water detection operation performed on each of the plurality of detection pins D_Pin, and according to various determination criteria, e.g., when water is detected at more than a reference number of detection pins D_Pin among the plurality of detection pins D_Pin. As described above, a method, performed by the water detection circuit 425 (or the MUIC 420), of detecting water may be implemented in various ways.

Figure 7:
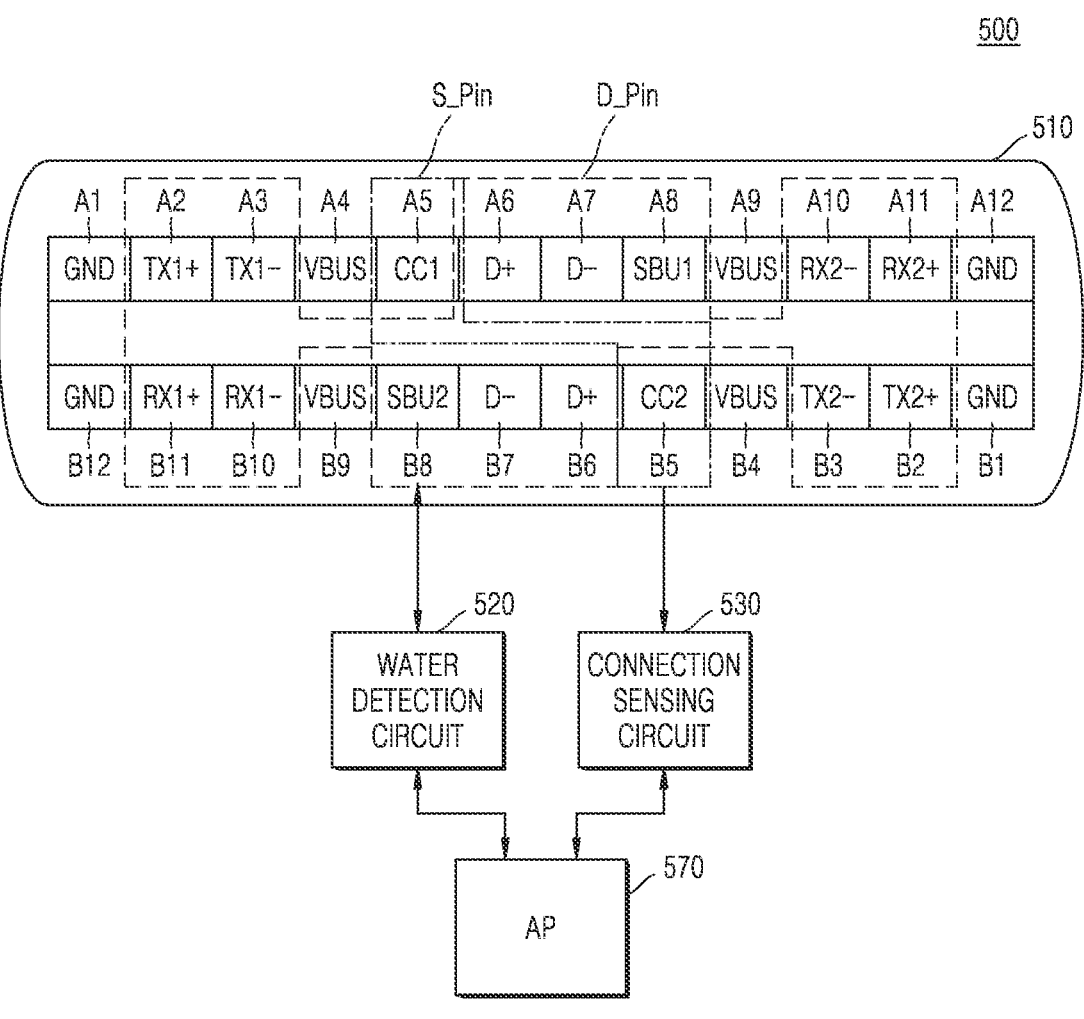
FIG. 7 is a diagram illustrating an example of simultaneously controlling a water detection circuit and a connection sensing circuit by using various types of pins.

FIG. 7 is a diagram illustrating an example of simultaneously controlling a water detection circuit and a connection sensing circuit by using various types of pins.

Referring to FIGS. 5 to 7, an electronic device 500 may include a connector 510 of a USB type-C, a water detection circuit 520, a connection sensing circuit 530, and an AP 570. The water detection circuit 520 may correspond to the water detection circuit 425 (or the MUIC 420) described above in FIG. 6, and the connection sensing circuit 530 may correspond to the connection sensing circuit 335 described above in FIG. 5 (or the CCIC 330). Redundant descriptions of the respective components are omitted.

In some implementations, to recognize a cable as described above, the CC1 and CC2 pins may be used as the sensing pin S_Pin, and at least one of the remaining pins (SBU1/SBU2 pins, TX/RX pins, D+/D− pins, etc.) described above in FIG. 6 may be used as the detection pin D_Pin.

In some implementations, a water detection operation of the water detection circuit 520 based on the detection pin D_Pin and a cable recognition operation of the connection sensing circuit 530 based on the sensing pin S_Pin may be simultaneously performed. That is, the AP 570 may simultaneously check the detection pin D_Pin and the sensing pin S_Pin. As is described below with reference to FIGS. 8 to 10, a simultaneous check operation may be performed by diverging from a certain state to a simultaneous check state.

More specifically, In some implementations, the water detection circuit 520 may generate the water detection result Det_w based on detection of a resistance value from the detection pin D_Pin as described above with respect to FIGS. 2 and 3, and the connection sensing circuit 530 may generate a recognition result as to which of a source and a sink is recognized as the cable (or an external device) based on cable recognition of the sensing pin S_Pin. Operations of generating the water detection result Det_w and the cable recognition result described above may be performed simultaneously. The water detection circuit 520 and the connection sensing circuit 530 may respectively provide the water detection result Det_w and the cable recognition result to the AP 570, and the AP 570 may control subsequent processes based on the results.

In some implementations, when receiving the water detection result Det_w indicating that water exists, the AP 570 may control components of the electronic device 500 to stop another operation, e.g., a cable recognition operation performed simultaneously, or a state so as to reduce damage, e.g., breakage of pins, to the electronic device 500 caused by water. Alternatively, when receiving the water detection result Det_w indicating that water exists, the AP 570 may enter a water state and perform subsequent operations. Also, in some implementations, when receiving the water detection result Det_w indicating that water does not exist and the cable recognition result, the AP 570 may perform subsequent processes for setting the role, e.g., either a source or a sink, of the electronic device 500 based on the cable recognition result as is described below.

As a result, the electronic device may simultaneously perform the water detection operation and the cable recognition operation for a conversion function (a role change function or a Try.Sink function), thereby reducing a recognition time required for connection of an external device. In addition, water detection and cable identification are performed simultaneously rather than separately, and thus, the accuracy of water detection and/or cable identification may be further improved.

Figure 8:
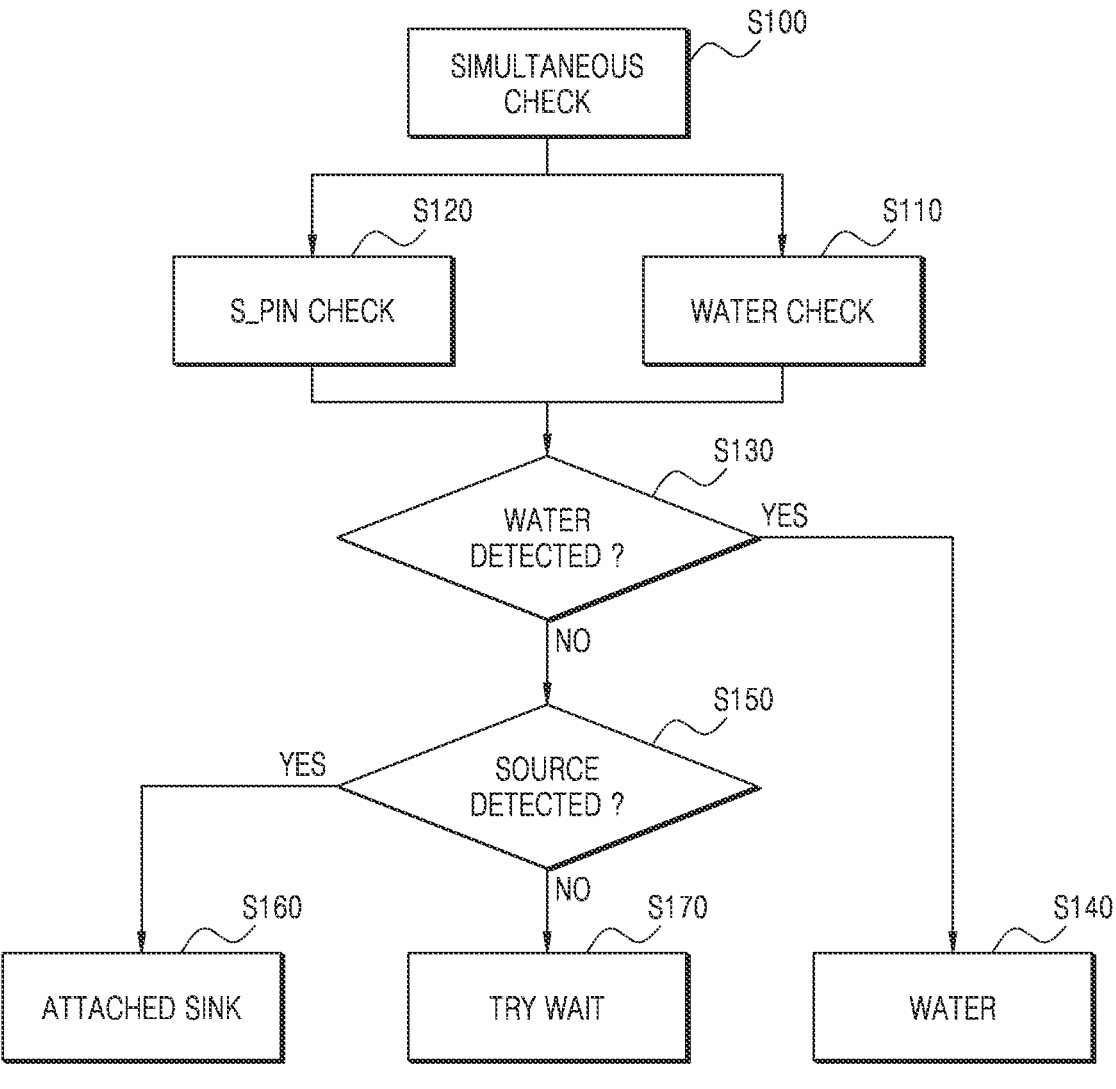
FIG. 8 is a flowchart illustrating an example of a method of simultaneously performing water detection and cable recognition.

FIG. 8 is a flowchart illustrating an example of a method of simultaneously performing water detection and cable recognition.

Referring to FIGS. 1, 7 and 8, the water detection method may simultaneously perform water detection and cable recognition. First, the electronic device 100 (or the AP 170) may enter a simultaneous check state in order to simultaneously perform water detection and cable recognition (S100). Accordingly, the AP 170 may perform a water detection operation based on the detection pin D_Pin (S110). The water detection operation may correspond to the operation described above with reference to FIG. 6. Simultaneously, the AP 170 may perform a cable recognition operation based on the sensing pin S_Pin (S120). The cable recognition operation may correspond to the operation described above with reference to FIG. 5. For example, the water detection operation and the cable recognition operation may be performed by the water detection circuit 120 and the connection sensing circuit 130, respectively.

The AP 170 may simultaneously perform operations S110 and S120 to respectively obtain a water detection result and a cable recognition result. Based on this, the AP 170 may determine whether water exists in the electronic device 100, e.g., in a connector (S130). When the AP 170 receives a detection result that water exists, the AP 170 may enter a water state to reduce damage to the electronic device 100 caused by water or to remain the connector in a dry state. (S140). In this case, other operations or states may be stopped.

In some implementations, when water does not exist, the AP 170 may determine whether a cable (or an external device) is recognized as a source based on the cable recognition result (S150). When the cable is recognized as the source (or supports a source role), because the electronic device 100 may operate as a sink, the AP 170 may set (or connect) the electronic device 100 as the sink (Attached Sink, S160).

Meanwhile, in some implementations, when the cable (or the external device) is not recognized as the source (or does not support the source role), and when the cable is recognized as the sink, because the electronic device 100 needs to be set as the source, the AP 170 may wait whether the cable is recognized as the sink (Try Wait, S170). Thereafter, when the cable is recognized as the sink, the AP 170 may set (or connect) the electronic device 100 as the source. Alternatively, when the cable is not even recognized as the sink, connection may be unattached.

Operations S130 and S150 may be performed simultaneously. Because the AP 170 may simultaneously perform the water detection operation and the cable recognition operation, the AP 170 may simultaneously perform operations S130 and S150 based on the water detection operation and the cable recognition operation. As described above, when receiving the detection result that water exists, the AP 170 may stop other operations or states regardless of other determination results and may enter the water state.

As a result, the water detection method may reduce time required for recognizing the external device by simultaneously performing the water detection operation and the cable recognition operation (that is, through a simultaneous check operation). In addition, water detection and cable recognition are simultaneously performed, and thus, the water detection method may further improve the accuracy of water detection and/or cable recognition. Furthermore, the water detection method may more efficiently recognize water and device through the definition of states for the simultaneous check operation.

Figure 9:
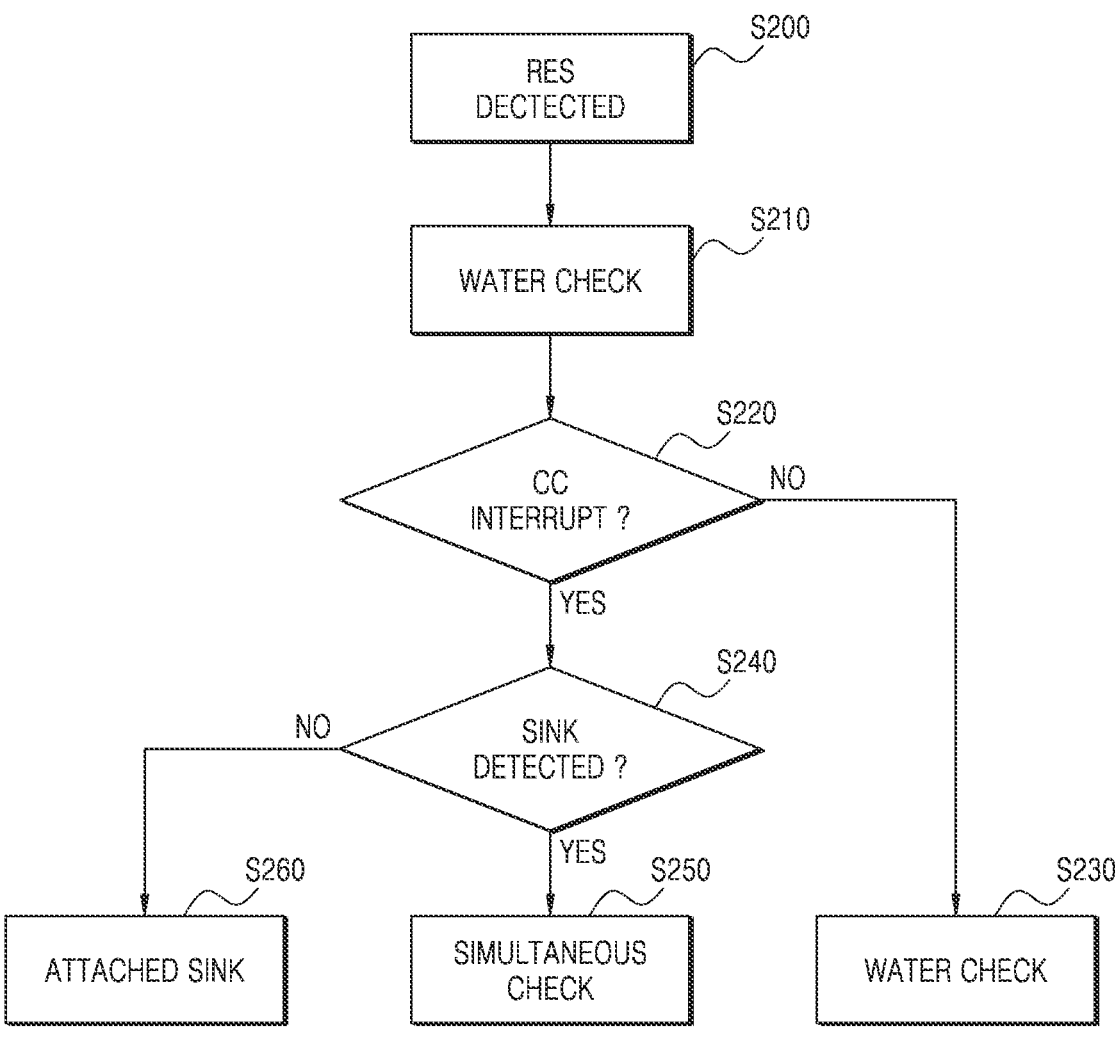
FIG. 9 is a flowchart for explaining examples of processes according to resistance value detection.

FIG. 9 is a flowchart for explaining examples of processes according to resistance value detection.

Referring to FIG. 9, a water detection method may include various processes for detecting water and/or recognizing a cable according to detection of resistance.

Referring to FIGS. 1 and 3, in some implementations, resistance may be detected based on the water detection circuit 220 (S200). For example, resistance may be detected in an unattached state in which there is no connection. The resistance detection of operation S200 may correspond to the first resistance detection (or simplicity detection) described above with reference to FIG. 3. In some implementations, the comparator 223 may generate the wait signal Sig_WA when a certain resistance value is detected based on the detection pin D_Pin. The wait signal Sig_WA may be provided to the AP 170, and the AP 170 may enter a wait attach state in response thereto (Wait Attach, S210). In the wait attach state, the AP 170 may wait for recognition of the connection sensing circuit 130 (specifically, recognition through a sensing pin). After waiting time, the AP 170 may determine whether the cable is recognized through the sensing pin (S220). For example, when the CC1 and/or CC2 pins are used as the sensing pin, the AP 170 may determine whether an interrupt has occurred in a CC pin, and when there is no CC interrupt, that is, when a cable connection itself is not sensed, does not need to simultaneously perform a recognition operation of the cable, and may perform a water detection operation (S230). Detection of resistance performed after operation S230 may correspond to the second resistance detection (or precision detection) described above with reference to FIG. 3. In some implementations, the resistance detector 221 may generate the water detection result Det_w through the water detector 222 when the certain resistance value is detected based on the detection pin D_Pin.

In some implementations, when the CC interrupt occurs, that is, when connection of the cable is detected, the AP 170 may perform subsequent processes according to a recognition result of the sensing pin. When the cable is recognized as a source (or supports a source role), because the electronic device 100 may operate as a sink, the AP 170 may set (or connect) the electronic device 100 as the sink (Attached Sink, S260). When the cable (or an external device) is recognized as the sink, because the cable may also be recognized as the source through the conversion function (Try.Sink function) described above, the AP 170 may enter a simultaneous check state (S250). Operation S250 may correspond to operation S100 described above with reference to FIG. 8.

As described above, the water detection method may simultaneously perform the cable recognition operation with the water detection operation when there is a possibility of detecting water. That is, because the first resistance detection (or simplicity detection) may be performed first through a comparator, etc., the water detection method may prevent the water detection operation that requires several processes from being performed by a single resistance detection, e.g., prevent unnecessary water detection processes from proceeding even though water does not exist or exists below a reference value.

Furthermore, the water detection method may prevent the simultaneous confirmation operation from being performed unnecessarily. That is, the water detection method may determine whether to perform the simultaneous check operation by assuming that there is a possibility that water is detected through the first resistance detection, thereby more efficiently perform water detection and cable recognition by setting entry into the simultaneous check state.

In addition, because the second resistance detection (or precision detection) may be performed when the presence of water is determined through the first resistance detection (or simplicity detection), and thus, the accuracy of water detection may be improved.

Figure 10:
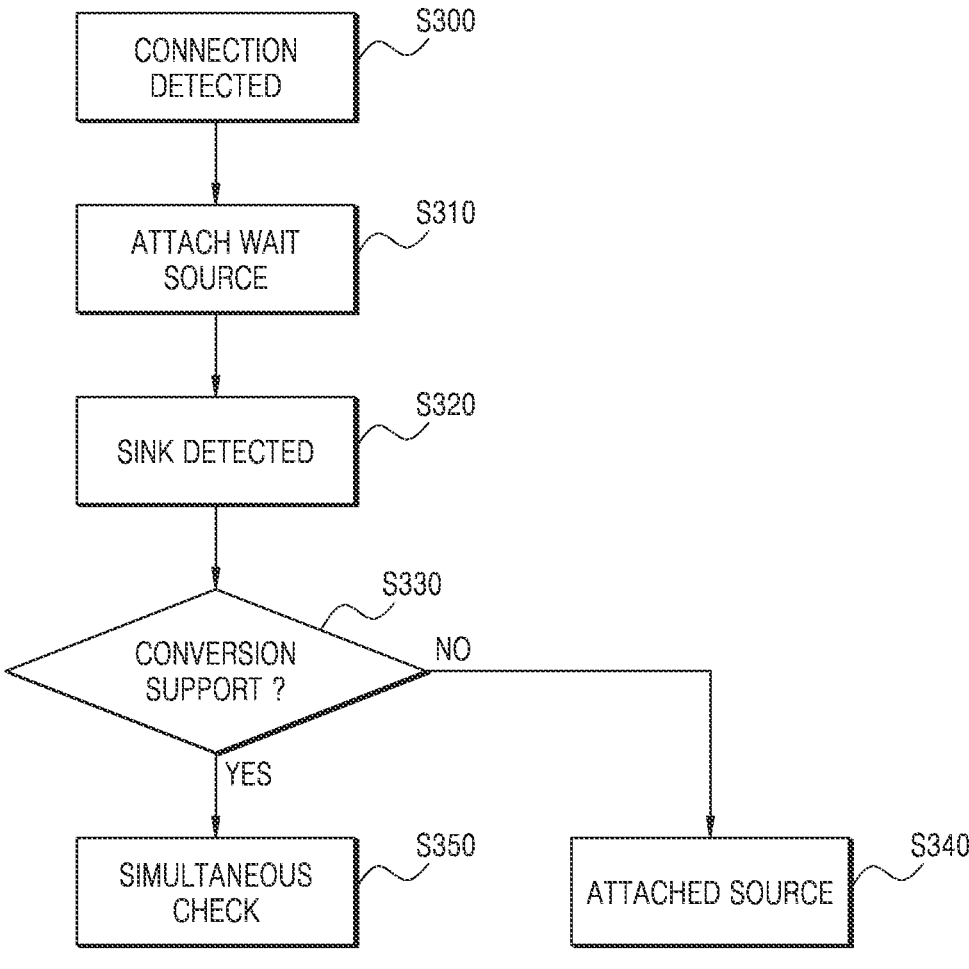
FIG. 10 is a flowchart illustrating examples of processes according to connection detection.

FIG. 10 is a flowchart illustrating examples of processes according to connection detection.

Referring to FIG. 10, a water detection method may include various processes for detecting water and/or recognizing a cable according to cable connection sensing.

Referring to FIG. 1, in some implementations, connection of a cable may be detected based on the connection sensing circuit 130 (S300). For example, a connection may be sensed in an unattached state in which there is no connection. When the connection is sensed in a state where the electronic device 100 is a source (or when the connection is sensed after a DRP toggle even when the electronic device 100 is the state), the AP 170 may enter a wait attach state (Attach Wait Source, S310). In operation S310, the AP 170 may recognize a connection of the sink through a sensing pin (S320). Even when a cable (or an external device) is recognized as the sink, and when the cable (or the external device) supports the conversion function (Try.Sink function) described above, because the role of the cable may be changed, the AP 170 may determine whether the cable supports the conversion function (S330).

In some implementations, when the cable does not support the conversion function, because the electronic device 100 must be set as a source, the AP 170 may set (or connect) the electronic device 100 as the source (Attached Source, S340). On the other hand, when the cable supports the conversion function, because the cable may be recognized as the source through the conversion function, the AP 170 may enter a simultaneous check state (S350). Operation S350 may correspond to operation S100 described above with reference to FIG. 8.

As described above, the water detection method may perform simultaneously the water detection operation with the cable recognition operation when the connection of the cable is sensed. That is, when the connection of the cable is sensed, the water detection method may determine whether to perform a simultaneous check operation according to whether the conversion function is supported, thereby reducing time required for water detection and cable recognition.

Figure 11:
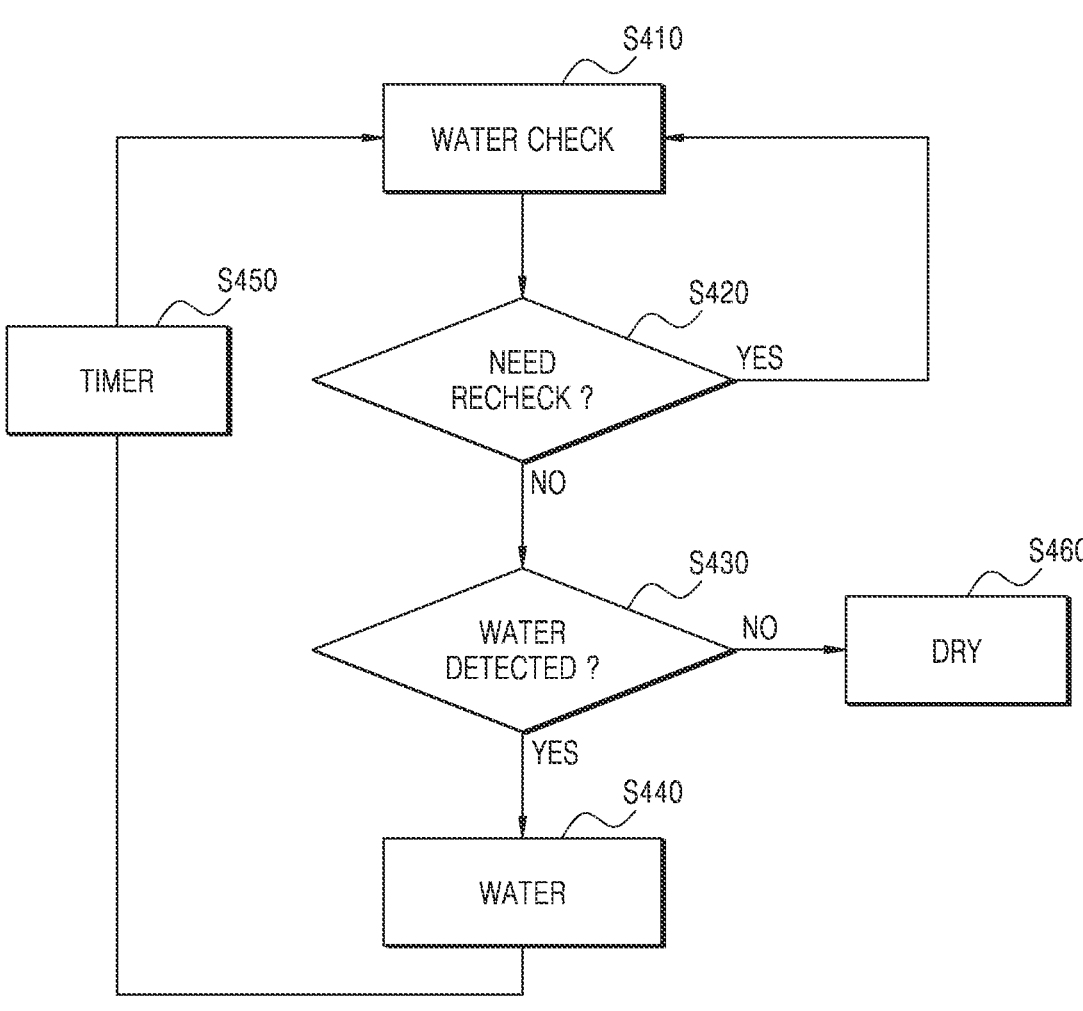
FIG. 11 is a flowchart illustrating an example of a process of detecting water.

FIG. 11 is a flowchart illustrating an example of a process of detecting water.

Referring to FIG. 11, a water detection method may include various processes for accurate water detection. A water detection operation of operation S410 may correspond to operation S110 of FIG. 8 and operation S230 of FIG. 9.

Referring to FIG. 1, the AP 170 may perform the water detection operation (S410). Specifically, resistance detection of the water detection circuit 120 may be performed to generate the water detection result Det_w. In some implementations, the resistance detection may correspond to the operation of the resistance detector 121 described above with reference to FIG. 2, or the second resistance detection (or precision detection) operation of the resistance detector 221 described above with reference to FIG. 3.

In some implementations, re-detection may be determined based on a detected resistance value (S410). Specifically, the resistance value detected in operation S410 may be inappropriate for determining whether water exists. For example, when the detected resistance value is within a reference range or smaller than the reference value, it may be determined that water exists. In this regard, considering an error range of measurement, the detected resistance value may overlap the reference range or include the reference value. In this case, re-detection of the resistance value may be performed for more accurate determination (Yes in S420). On the other hand, when the detected resistance value is appropriate for determining whether water exists, it may be determined whether water is detected (S430).

As a result of the water detection operation, when it is determined that water does not exist, the AP 170 may enter a dry state (S460) and then diverge to an unattached state. On the other hand, when it is determined that water exists, the AP 170 may enter a water state (S440). When water is detected, the AP 170 may perform the water detection operation again after a certain time (S450). However, the present disclosure is not limited thereto, and a process of performing the water detection operation again may be implemented in various ways. For example, the AP 170 may perform the water detection operation again according to a certain interruption.

As described above, the water detection method may improve the accuracy of water detection by determining whether to perform re-detection based on the resistance detection value in the water detection operation that is simultaneously performed.

Figure 12:
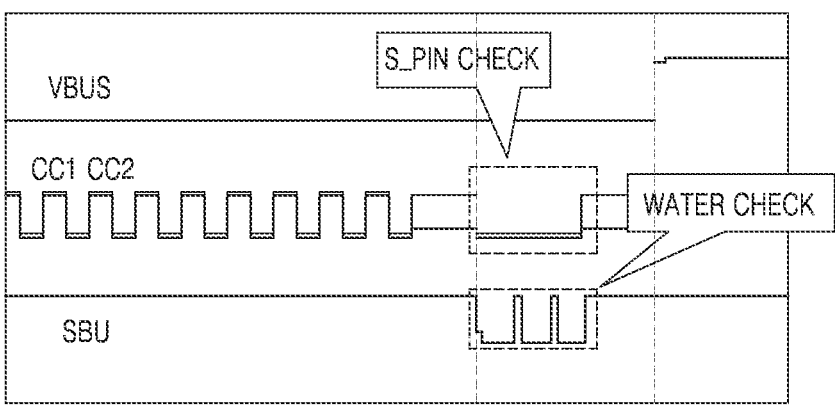
FIG. 12 is a graph illustrating waveforms according to simultaneous check of water detection and cable recognition.

FIG. 12 is a graph illustrating waveforms according to simultaneous check of water detection and cable recognition.

Referring to FIGS. 7 and 12, in some implementations, according to a simultaneous check operation, a water detection operation of the water detection circuit 520 and a cable recognition operation of the connection sensing circuit 530 may be performed simultaneously. For example, the water detection circuit 520 may use at least one of SBU1 and SBU2 pins as the detection pins D_Pin, and the connection sensing circuit 530 may use CC1 and CC2 pins as the sensing pins S_Pin.

The detection pin D_Pin and the sensing pin S_Pin may be simultaneously checked by the simultaneous check operation, and as shown, a water detection result of the SBU pin and cable recognition results of the CC1 and CC2 pins may be output simultaneously.

As described above, the water detection method and the electronic device performing the water detection method according to the example may simultaneously perform water detection and cable recognition, thereby reducing recognition time required when an external device is connected.

While the present disclosure has been particularly shown and described with reference to examples thereof, it will be understood that various changes in form and details may be made therein without departing from the spirit and scope of the following claims.

What is claimed is:

1. An electronic device comprising:
a connector connected to a cable of an external device and comprising a plurality of pins;
a water detection circuit connected to at least one detection pin of the plurality of pins, the water detection circuit being configured to;
detect, based on the at least one detection pin, whether water exists in the connector, and
generate first result data indicating an existence of water in the connector;
a connection sensing circuit connected to at least one sensing pin of the plurality of pins, the connection sensing circuit being configured to:
recognize the cable based on the at least one sensing pin, and
generate second result data, different from first result data, indicating the cable is recognized; and
an application processor configured to, based on the first and second result data, control the water detection circuit and the connection sensing circuit to perform detection of the water and recognition of the cable simultaneously.

2. The electronic device of claim 1, wherein the water detection circuit includes:
a comparator configured to generate a signal to wait for recognition of the at least one sensing pin based on detection of a resistance value from the at least one detection pin; and
a resistance analog-to-digital converter (ADC) configured to output a digital value based on the resistance value detected from the at least one detection pin.

3. The electronic device of claim 1, wherein the electronic device is configured to be recognized as either a device that supplies power or a device that receives power, based on recognition of the cable by the connection sensing circuit.

4. The electronic device of claim 1, wherein the cable is configured to be in communication using the at least one detection pin and the at least one sensing pin.

5. The electronic device of claim 4, wherein the connector is configured to communicate with the cable according to a universal serial bus (USB) type-C interface.

6. The electronic device of claim 5, wherein the at least one detection pin includes at least one of a sideband use (SBU)1 pin or an SBU2 pin, defined in the USB type-C interface.

7. The electronic device of claim 5, wherein the at least one sensing pin includes at least one of a configuration channel (CC)1 pin or a CC2 pin, defined in the USB type-C interface.

8. The electronic device of claim 7, wherein the connection sensing circuit is disposed in a CC integrated circuit (CCIC) that performs data connection and control through at least one of the CC1 pin or the CC2 pin.

9. The electronic device of claim 5, wherein the water detection circuit is disposed at a micro USB integrated circuit (MUIC), the MUIC including a resistance ADC configured to output, based on a resistance value detected from the at least one detection pin, a digital value.

10. A water detection method of an electronic device, the water detection method comprising:
simultaneously performing water detection and cable recognition of a connector comprising a plurality of pins; and
performing a subsequent process,
wherein simultaneously performing water detection and cable recognition includes:
detecting, using a first integrated circuit (IC), whether water exists in the connector based on at least one detection pin of the plurality of pins,
generating first result data indicating an existence of water in the connector,
recognizing, using a second IC, a cable based on at least one sensing pin of the plurality of pins, and
generating second result data, different from first result data, indicating the cable is recognized, wherein performing the subsequent process is based on the first and second result data.

11. The water detection method of claim 10, wherein performing the subsequent process includes:
setting the electronic device as a sink based on water not being detected and the cable being recognized as a source.

12. The water detection method of claim 10, wherein performing the subsequent process includes:
based on the first IC not detecting water and the second IC not recognizing the cable as a source, waiting until the second IC determines whether the cable is recognized as a sink.

13. The water detection method of claim 10, further comprising:
waiting for recognition of the at least one sensing pin based on detection of a resistance value of the at least one detection pin.

14. The water detection method of claim 10, further comprising:
based on sensing a connection of the cable, determining whether to simultaneously perform the water detection and the cable recognition based on determining whether the cable supports a function of conversion between a source and a sink.

15. The water detection method of claim 10, wherein the connector is configured to communicate with the cable according to a universal serial bus (USB) type-C interface.

16. The water detection method of claim 15, wherein the at least one detection pin includes at least one of a sideband use (SBU)1 pin or an SBU2 pin, defined in the USB type-C interface.

17. The water detection method of claim 10, wherein performing the subsequent process includes:
based on the first IC detecting the water, repeating detection of whether water exists until the connector is in a dry state.

18. The water detection method of claim 10, wherein detecting whether water exists comprises:

determining whether to re-detect water, based on a resistance value detected from the at least one detection pin.

19. A water detection method of an electronic device comprising a connector having a plurality of pins, the water detection method comprising:

recognizing a role of an external device by using at least one sensing pin of the plurality of pins;

generating first result data indicating the role of the external device;

detecting water in the connector by using at least one detection pin of the plurality of pins;

generating second result data, different from first result data, indicating an existence of water in the connector; and setting the electronic device as either a host or a device based on the first result data, wherein recognizing the role and detecting the water are performed simultaneously.

20. The water detection method of claim 19, wherein setting the electronic device as either a host or a device includes:

based on water not being detected and the external device being recognized as a host, setting the electronic device as a device; and based on the external device being not recognized as the host, waiting until it is determined whether the external device is recognized as the device.

\*   \*   \*   \*   \*